UNITED STATES PATENT OFFICE.

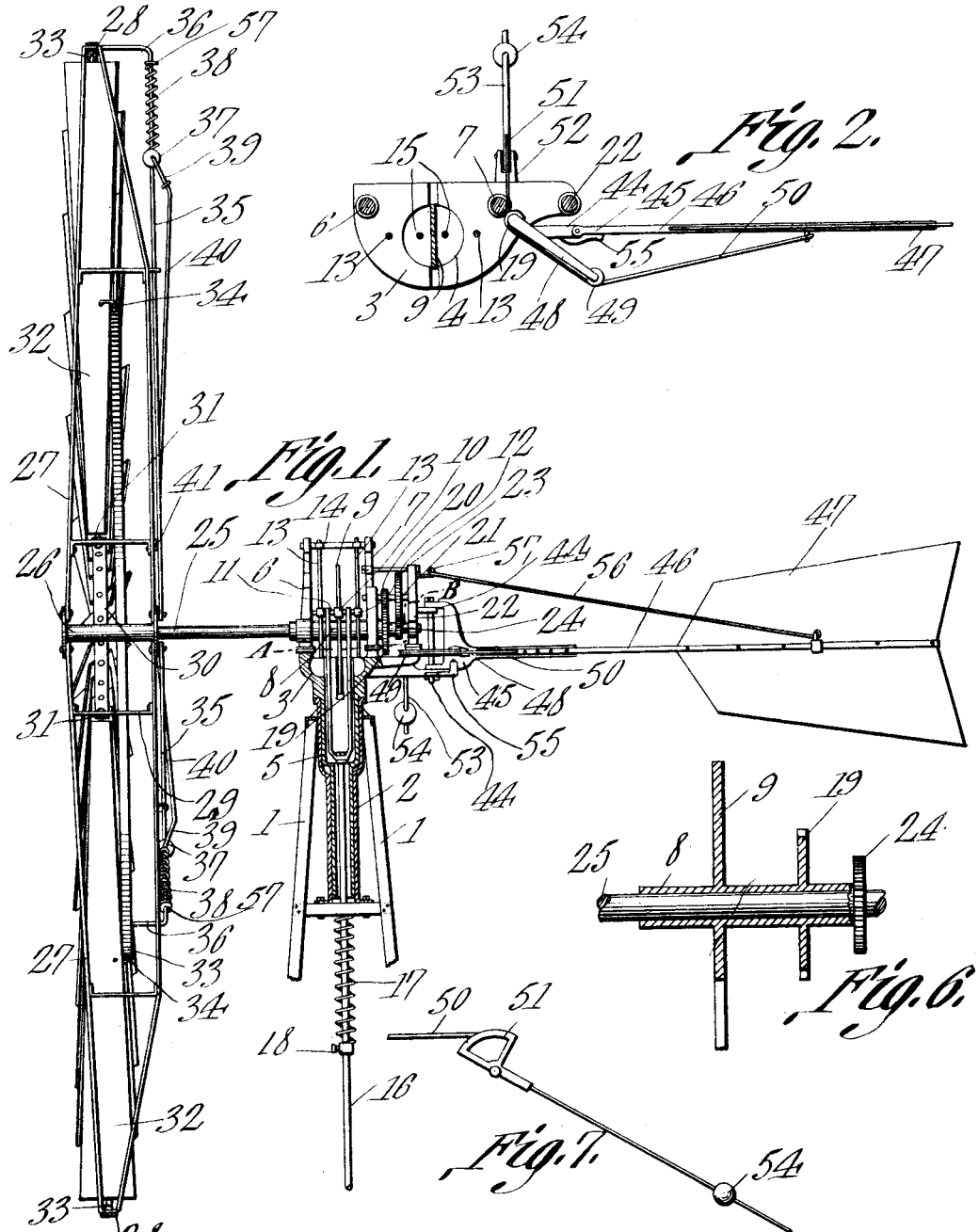

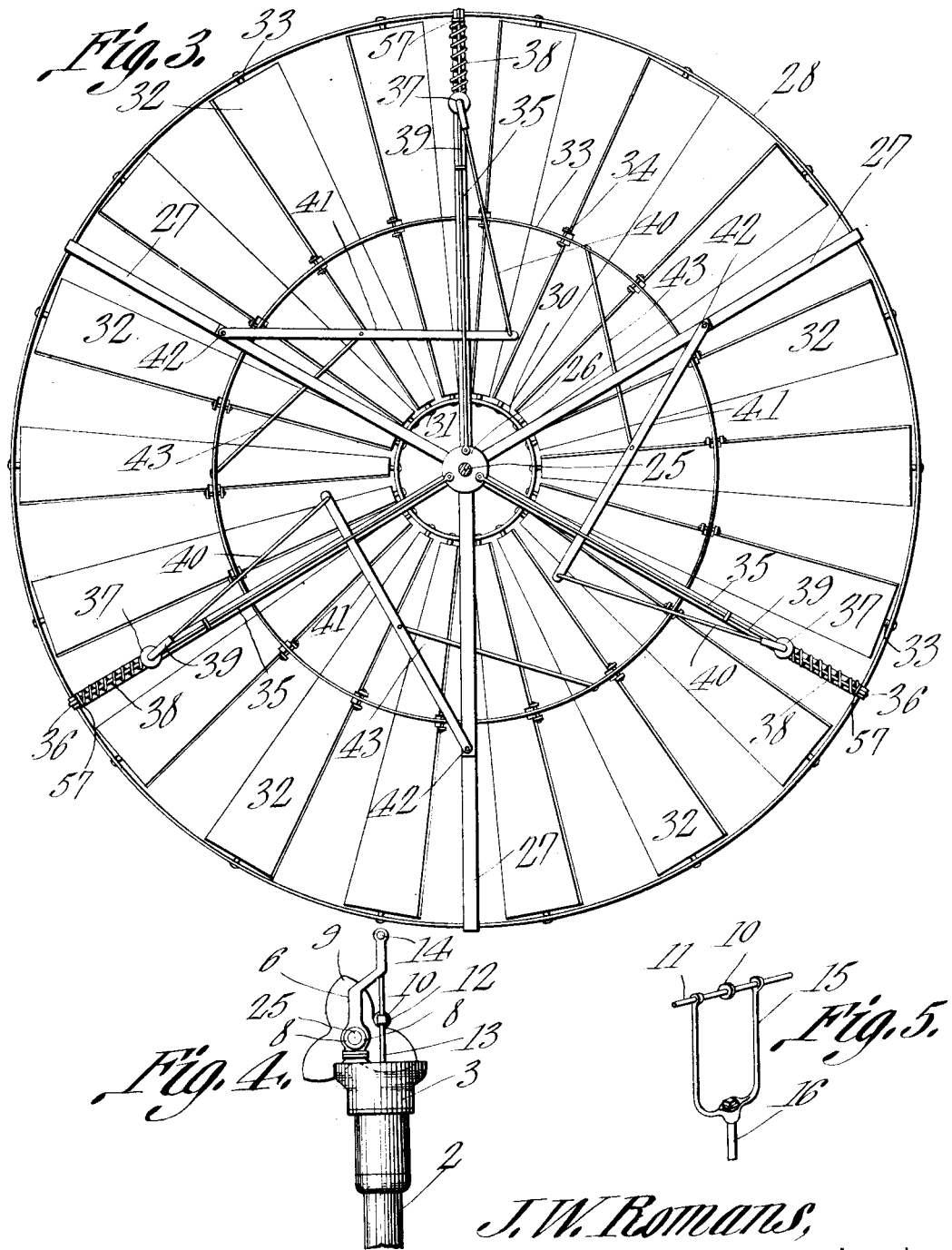

JOHN W. ROMANS, OF DENISON, TEXAS, ASSIGNOR OF THIRTY ONE-HUNDREDTHS TO SAMUEL E. RIVES AND THIRTY ONE-HUNDREDTHS TO WILLIAM T. CACKLEY, OF DENISON, TEXAS.

WINDMILL.

1,033,351.  Specification of Letters Patent.  Patented July 23, 1912.

Application filed October 3, 1911. Serial No. 652,623.

*To all whom it may concern:*

Be it known that I, JOHN W. ROMANS, a citizen of the United States, residing at Denison, in the county of Grayson and State of Texas, have invented a new and useful Windmill, of which the following is a specification.

This invention relates to wind mills, one of its objects being to provide a wind wheel having means operated by centrifugal force, for shifting the blades of the wheel, automatically relative to the axis of rotation of said wheel so as to maintain uniform the speed of rotation of the wheel.

A further object is to provide improved means for transmitting motion from the power shaft of the windmill to the pump rod, said means serving to multiply the number of strokes of the rod obtained.

A further object is to provide a vane having improved means for maintaining it normally in a predetermined position relative to the action of rotation of the wind wheel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a view partly in side elevation and partly in section of a wind mill embodying the present improvements. Fig. 2 is a section on line A—B Fig. 1. Fig. 3 is a rear elevation of the wind wheel, its shaft being shown in section. Fig. 4 is a side elevation of the head of the wind mill and of the cam wheel supported thereabove. Fig. 5 is a perspective view of the upper end portion of the pump rod and of its yoke and bearing member. Fig. 6 is a longitudinal section through the tubular shaft of the cam wheel, the main shaft being shown in elevation therein. Fig. 7 is a side elevation of the vane controlling lever and the segment actuated thereby.

Referring to the figures by characters of reference 1 designates the upper portion of the tower of the wind mill and secured within said upper portion is a tubular bearing 2 on which is mounted a revoluble head 3. This head has a central opening 4 and a tubular bearing extension 5 projects downwardly from the head and is adapted to rotate within the bearing member 2. Standards 6 and 7 are bolted or otherwise secured upon and extend upwardly from the head 3, the lower end portions of these standards being preferably offset, as indicated in Fig. 4 so as to support, at one side of the opening 4, a tubular shaft 8 to which is secured a cam wheel 9 preferably formed with three substantially ovate wings, as clearly indicated in Fig. 4. These wings are adapted, during the rotation of the cam wheel, to successively move under and elevate an anti-friction roller 10 carried by a cross bar 11 the ends of which are mounted within sleeves 12 adapted to slide upon parallel guide rods 13. These rods are secured at their lower ends to the head 3 and at their upper ends to a cross bar 14 supported by the upper ends of the standards 6 and 7. A yoke 15 is connected to the rod 11 and extends downwardly therefrom, the lower or intermediate portion of the yoke being attached to the upper end of the pump rod 16. Said pump rod extends longitudinally through the tubular bearing extension 5 and has a spring 17 mounted thereon, one end of the spring bearing against a portion of the tower 1 while the other end bears upon a collar 18 connected to the rod 16. Said spring thus serves to hold the pump rod normally pressed downwardly and it will be apparent that each time one of the wings of the cam wheel 9 elevates the anti-friction roller 10 and the yoke 15, the rod 16 will be moved upwardly therewith, but as soon as the anti-friction roller 10 passes the elevated end or apex of the wing, the spring 17 will throw the rod 16 and the parts connected thereto downwardly into position to be promptly elevated by the next wing of the wheel 9 engaging the roller 10.

A gear 19 is secured to one end of the tubular shaft 8 and meshes with a smaller gear 20 secured to a counter shaft 21. This counter shaft is journaled within the standard 7 and within an additional standard 22 extending upwardly from the head 3. Another gear 23 is secured to the counter shaft 21 and is much larger than the gear 20, this gear 23 meshing with a smaller gear 24 which, in turn, is keyed or otherwise secured to the main drive shaft 25 of the wind mill. This drive shaft extends through the tubular shaft 8 and has one end portion journaled in the standard 22.

The wind wheel is connected to the outer end of the shaft 25 and includes a hub 26 from which radiates spokes 27 arranged in pairs, said spokes converging outwardly and being connected, at their outer ends, to the rim 28 of the wheel. Preferably six pairs of spokes are employed although it is to be understood that this number may be increased or diminished if desired. Cross strips 29 connect the spokes of each pair at points near the hub 26 and these strips are secured to and support a ring 30 in which are journaled trunnions 31 extending from the inner ends of the blades 32 of the wheel. Additional trunnions 33 extend from the outer ends of the blades 32 and are journaled in the rim 28.

A connecting and shifting ring 33 is arranged concentric with the ring 30 and extends across the inner edges of the blades 32 at points between the ends thereof, there being ears 34 outstanding from said edges of the wings and pivotally connected to the ring. Thus it will be seen that when the ring is rotated in one direction all of the blades will be simultaneously swung upon their respective longitudinal axes so as to practically close the space between the rim 28 and the ring 30 whereas, when the ring 33 is rotated in the opposite direction, all of the blades 32 will be swung so as to lie in planes substantially perpendicular to the plane of rotation of the wheel.

Guide rods 35 are arranged longitudinally along certain of the spokes and are connected, at their outer ends, to the rim 28, as indicated at 36. Each of these rods has a weight 37 mounted to slide thereon and a spring 38 is mounted on each rod between the weight and the outer end portion 36 of the rod so as to hold the weight normally pressed inwardly toward the center of the wheel. A yoke 39 is pivotally connected to each weight and is formed at the outer end of a connecting rod 40. Each rod is pivotally connected to one end of a lever 41 mounted to work between the rod 35 and the spoke 27 to which the rod is connected. The other end of the lever is pivotally connected to the adjacent spoke 27, as indicated at 42. A link 43 is pivotally connected, at one end, to each lever 41, at a point between the ends of the lever and the other end of each link is pivotally connected to the ring 33.

Ears 44 extend from the head 3 and the standard 22 and are pivotally connected to a yoke 45 formed at one end of an arm 46 carrying a vane 47. An arm 48 extends from the head 3 at an angle to the shaft 25 and carries, adjacent its ends, guide sheaves 49 on which is mounted a chain or cable 50, or any other suitable flexible connection. One end of this connection is attached to one side of the arm 46 of the vane 47 while the other end of the connection is attached to a grooved segment 51 journaled in a bracket 52 extending from one side of the head 3. This segment works in a plane perpendicular to the axis of rotation of the shaft 25 and an arm 53 extends from the segment and carries an adjustable weight 54. This weighted arm 53 causes the segment 51 to pull upon the connection 50 and thus hold the arm 46 of the vane normally pressed against a suitable stop 55.

The vane 47 is preferably braced by means of a rod 56 connected at one end to the outer portion of arm 46 and at its other end to a bracket 57 extending above the ears 44.

It will be apparent that a current of air, when directed against the blades 32, will cause the wind wheel to rotate and shaft 25 will be rotated with the wheel so that motion will be transmitted through gears 24, 23, 20 and 19, to the tubular shaft 8 on which the cam wheel 9 is secured. Said wheel will thus rotate so as to reciprocate the yoke 15 and the pump rod 16, each wing of the cam wheel serving to elevate the anti-friction roller 10 and thus place the spring 17 under stress while said spring promptly moves the anti-friction roller 10, the yoke 15 and the rod 16 downwardly as shown as the parts have been raised to their highest positions. Thus during each complete rotation of the shaft 8, the pump rod is elevated three times. Obviously the weighted arm 53 will keep the vane 47 in the wind under normal conditions but should a strong current of air move against one side of the vane, said vane would be swung about its connection with the ears 44, this resulting in the actuation of the connection 50 and the elevation of the weighted lever 53.

The blades 32 of the wheel are normally set so as to cause the wheel to rotate when a current of air moves directly against the face of the wheel. If, however, the velocity of the wind should increase the speed of rotation of the wheel to an undesirable extent, the weights 37 will be thrown outwardly by centrifugal force against the springs 38 and will thus pull on the rods 40 and cause the levers 41 to swing upon their fulcrums. The levers will in turn pull on the links 43 and these links will cause the ring 33 to rotate and thus swing all of the blades 32 simultaneously so as to bring their edges into the wind and reduce the speed of rotation of the wheel or else bring the wheel to a complete stop. The governor made up of the wings 37 and the parts coöperating therewith will, obviously, thus operate to cause the wheel to rotate practically at a uniform speed and there is thus no danger of the wind mill being blown over when subjected to air currents of high velocity.

It is to be understood that any suitable means, not shown, may be employed for cutting out the wheels so as to stop the operation of the wind mill whenever desired.

Each of the springs 38 preferably bears outwardly against an adjusting nut 57 whereby the stress of the spring can be varied so as to cause the blades of the wheel to either reduce or increase their resistance to the air currents, as desired, and thus vary the speed of rotation of the wheel.

It will be seen, by referring particularly to Fig. 1 of the drawings that the guide rods 35 and the major portions of the wheel spokes are located outside of the plane of rotation of the blades of the wheel. Thus it will be seen that the blades can, when in inactive positions, be disposed with their edges close together and with their corresponding faces in the same planes. Obviously should the guide rods and the spokes be extended between the blades of the wheel, it would not be possible to use as many blades because the spaces between the blades would have to be sufficiently wide to receive the rods and spokes. Furthermore by bridging the rods and spokes around the blades as shown, they can be located at any points desired on the wheel without interfering with the movement of the adjacent blades about their respective axes.

By arranging the springs 38 on the rods 35, they are engaged directly by the centrifugally operated weights 37 and it is not necessary to utilize any intermediate mechanism for transmitting motion from the weights to the springs.

What is claimed is:—

1. In a wind mill, a wheel including a series of uniformly spaced radial blades mounted for axial movement, a connection between the blades, radially disposed guide rods movable with the wheel and disposed outside of the plane of rotation of the blades, a weight slidably mounted on each of said rods, wheel spokes disposed at their inner ends outside of the plane of rotation of the blades, levers fulcrumed upon certain of said spokes, connections between said levers and the adjacent weights, and pivotal connections between the levers and the blades.

2. In a wind mill, a wheel including a series of radially disposed blades mounted for rotation about their respective axes, a ring connecting the blades, spokes arranged at their inner ends outside of the plane of rotation of the blades about the axis of the wheel, radially disposed rods located outside of the plane of rotation, weights slidably mounted on the rods, levers fulcrumed on the spokes, connections between the levers and the adjacent weights, connections between the levers and the ring, and springs upon the rods and constituting means for holding the weights normally shifted inwardly from the rim of the wheel.

3. In a wind mill, a wheel including a series of uniformly spaced radial blades mounted for axial movement, a connection between the blades, radially disposed guide rods movable with the wheel and disposed outside of the plane of rotation of the blades, a weight slidably mounted on each of said rods, wheel spokes disposed at their inner ends outside of the plane of rotation of the blades, levers fulcrumed upon certain of said spokes, connections between said levers and the adjacent weights, pivotal connections between the levers and the blades, and springs on the rods and interposed between the weights and the wheel rim.

4. In a wind mill, a wheel including a rim, a series of radially disposed blades surrounded by the rim and normally disposed in the same plane and in close relation, a ring concentric with the rim and pivotally connected to the respective blades, guide rods disposed radially and connected to the rim, said rods being located outside of the paths of movement of the blades, centrifugally operated weights slidable on the rods, springs on the respective rods for retarding the movement of the weights, and means operated by the movement of one or more of the weights for rotating the ring to simultaneously shift the blades about their individual axes.

In testimony that I claim the foregoing as my own, I have hereto affixed my signature in the presence of two witnesses.

JOHN W. ROMANS.

Witnesses:
S. E. Rives,
W. T. Cackley.